United States Patent [19]
Kline

[11] Patent Number: 5,793,747
[45] Date of Patent: Aug. 11, 1998

[54] EVENT-DRIVEN CELL SCHEDULER AND METHOD FOR SUPPORTING MULTIPLE SERVICE CATEGORIES IN A COMMUNICATION NETWORK

[75] Inventor: Richard Kline, E. Walpole, Mass.

[73] Assignee: Motorola, Inc., Schaumburg, Ill.

[21] Appl. No.: 616,147

[22] Filed: Mar. 14, 1996

[51] Int. Cl.[6] .................................................. H04J 1/16
[52] U.S. Cl. ........................................ 370/230; 370/412
[58] Field of Search .......................... 370/395, 412–413, 370/415, 414, 229, 230–235, 429, 428, 416, 418, 417

[56] References Cited

U.S. PATENT DOCUMENTS

| | | | |
|---|---|---|---|
| 5,497,375 | 3/1996 | Hluchyj et al. | 370/395 |
| 5,515,363 | 5/1996 | Ben-Nun et al. | 370/395 |
| 5,533,020 | 7/1996 | Byre et al. | 370/395 |
| 5,537,408 | 7/1996 | Branstad et al. | 370/395 |

OTHER PUBLICATIONS

ATM "User–Network Interface Specification", Version 3.0, Fred Sammartino.
The ATM Forum Newsletter, Oct., 1995 vol. 3, Issue 4 "53 Bytes".
The ATM Forum, Technical Committee, "Traffic Management Specifications", Version 4.0, Feb., 1996.

Primary Examiner—Douglas W. Olms
Assistant Examiner—Ajit Patel
Attorney, Agent, or Firm—Darleen J. Stockley; Jeffrey T. Klayman

[57] ABSTRACT

The event scheduler (100; 200) and method (300) of the present invention solve the problem of mixing multiple service categories on the same physical link or media by utilizing a calendar queue scheduling method (i.e., based on prior actual transmission times of previous packets). The event-driven cell scheduler is, for example used in an asynchronous transfer mode ATM network and may, for example, be embodied in software, hardware and firmware.

23 Claims, 11 Drawing Sheets

1302

IN STEP 606, ON FIRST CELL ARRIVAL, WHERE A TIME NOW IS GREATER THAN TIME EARLIEST,
A) UPDATING TIME EARLIEST EQUAL TO TIME NOW, WHERE TIME NOW IS AN OUTPUT OF A REAL TIME CLOCK, AND STORING UPDATED TIME EARLIEST IN A PER CONNECTION CONTEXT MEMORY AND
B) SETTING A RESET FLAG TO TRUE IN A PER CONNECTION CONTEXT MEMORY;

1304

IN STEP 620,
A) WITH RESPECT TO THE RESET FLAG,
A1) WHERE RESET FLAG IS EQUAL TO TRUE,
A1a) SETTING RESET FLAG TO FALSE
A1b) AND SETTING THRESHOLD EQUAL TO TIME EARLIEST PLUS {A PREDETERMINED CONSTANT TIMES A RECIPROCAL OF A PREDETERMINED SUSTAINABLE CELL RATE} IN THE PER CONNECTION CONTEXT MEMORY;

A1c) AND WHERE A THEORETICAL TRANSMISSION TIME TTT IS LESS THAN TIME NOW, SETTING TTT= TIME NOW;

A2) WHERE RESET FLAG IS EQUAL TO FALSE, SETTING THRESHOLD EQUAL TO THRESHOLD PLUS A RECIPROCAL OF THE PREDETERMINED SUSTAINABLE CELL RATE (SCR);
AND
B) UPDATING TIME EARLIEST TO TIME NOW PLUS CELL PERIOD, WHERE CELL PERIOD IS A RECIPROCAL OF A PREDETERMINED PEAK CELL RATE (PCR) AND STORING UPDATED TIME EARLIEST IN THE PER CONNECTION CONTEXT MEMORY;

AND C) WHERE NOTIFIED IN STEP 618 THAT A PER CONNECTION PACKET QUEUE WAS UNEMPTY,
C1) UPDATING A THEORETICAL TRANSMISSSION TIME (TTT) TO A VALUE OF TTT PLUS THE RECIPROCAL OF THE SUSTAINABLE CELL RATE (SCR) AND STORING THE UPDATED TTT IN THE PER CONNECTION CONTEXT MEMORY;
C2) WITH RESPECT TO TIME NOW AND THRESHOLD,
C2a) WHERE TIME NOW IS GREATER THAN THRESHOLD, SETTING THE PRIORITY INDEX EQUAL TO A VALUE INDICATING A HIGH PRIORITY VBR TASK QUEUE;

C2b) WHERE TIME NOW IS LESS THAN OR EQUAL TO THRESHOLD,
C2b1) SETTING THE PRIORITY INDEX EQUAL TO VALUE INDICATING A NORMAL PRIORITY VBR TASK QUEUE;

C2b2) WHERE THRESHOLD IS GREATER TO THRESHOLD THAN TIME NOW PLUS A PREDETERMINED CONSTANT TIMES A RECIPROCAL OF A PREDETERMINED SUSTAINABLE CELL RATE (SCR), SETTING THRESHOLD EQUAL TO TIME NOW PLUS A PREDETERMINED CONSTANT TIMES A RECIPROCAL OF A PREDETERMINED SUSTAINABLE CELL RATE (SCR),

AND C2b3) WHERE TIME EARLIEST IS LESS THAN TTT MINUS A PREDETERMINED MAXIMUM BURST SIZE CONSTANT TMBS, SETTING TIME EARLIEST EQUAL TO TTT MINUS A PREDETERMINED MAXIMUM BURST SIZE CONSTANT TMBS.

*FIG. 13*

EVENT-DRIVEN CELL SCHEDULER AND METHOD FOR SUPPORTING MULTIPLE SERVICE CATEGORIES IN A COMMUNICATION NETWORK

CO-PENDING APPLICATIONS

The present application may be related to co-pending applications that are being filed concurrently: U.S. application Ser. No. 08/616,024 filed Mar. 14, 1996, EFFICIENT OUTPUT-REQUEST PACKET SWITCH AND METHOD, by Craig Sheppard Holt, Richard Kline, and Krishnan Ramakrishnan; and U.S. application Ser. No. 08/616,029 filed Mar. 14, 1996, METHOD AND DEVICE FOR MULTIPOINT SWITCHING AND ARBITRATION IN OUTPUT-REQUEST PACKET SWITCH, by Craig Sheppard Holt, Richard Kline, and Krishnan Ramakrishnan.

FIELD OF THE INVENTION

The present invention relates to asynchronous transfer mode switching systems and more particularly, to scheduling transmission times for cells in asynchronous transfer mode switching systems.

BACKGROUND OF THE INVENTION

In packet-based networks such as asynchronous transfer mode (ATM) networks, a maximum transmission bit rate may be set up, for example, by utilizing packets that have constant lengths per unit of time. Constant length packets are referred to as cells. In networks that mix multiple service categories on a same physical link or media, traffic shaping is problematic. Traditional methods rely on Usage Parameter Control (UPC), i.e., "policing", on ingress ports, followed by cell enqueuing with selective cell discard on egress ports, followed by simple Head Of Line Priority (HOLP) mechanisms on egress ports for selectively dequeuing cells for transmission. Weighted Round Robin (WRR) polling service disciplines have been proposed for mixing traffic with different service requirements, but may become difficult at high speeds when hundreds or thousands of connections need to be multiplexed.

The difficulty arises because the WRR is a polling mechanism that requires multiple polls to find a queue that requires service. Since each poll requires a fixed amount of work, it becomes impossible to poll at a rate that accommodates an increased number of connections. In particular, when many connections from bursty data sources are idle for extended periods of time, many negative polls may be required before a queue is found that requires service.

Thus, there is a need for an event-driven cell scheduler for supporting multiple service categories in an asynchronous transfer mode ATM network.

BRIEF DESCRIPTION OF THE DRAWINGS

FIG. 13 shows additional steps for utilizing the method of the present invention in variable bit rate (VBR) packet traffic in a cell-based switch.

DETAILED DESCRIPTION OF A PREFERRED EMBODIMENT

Figure 1:
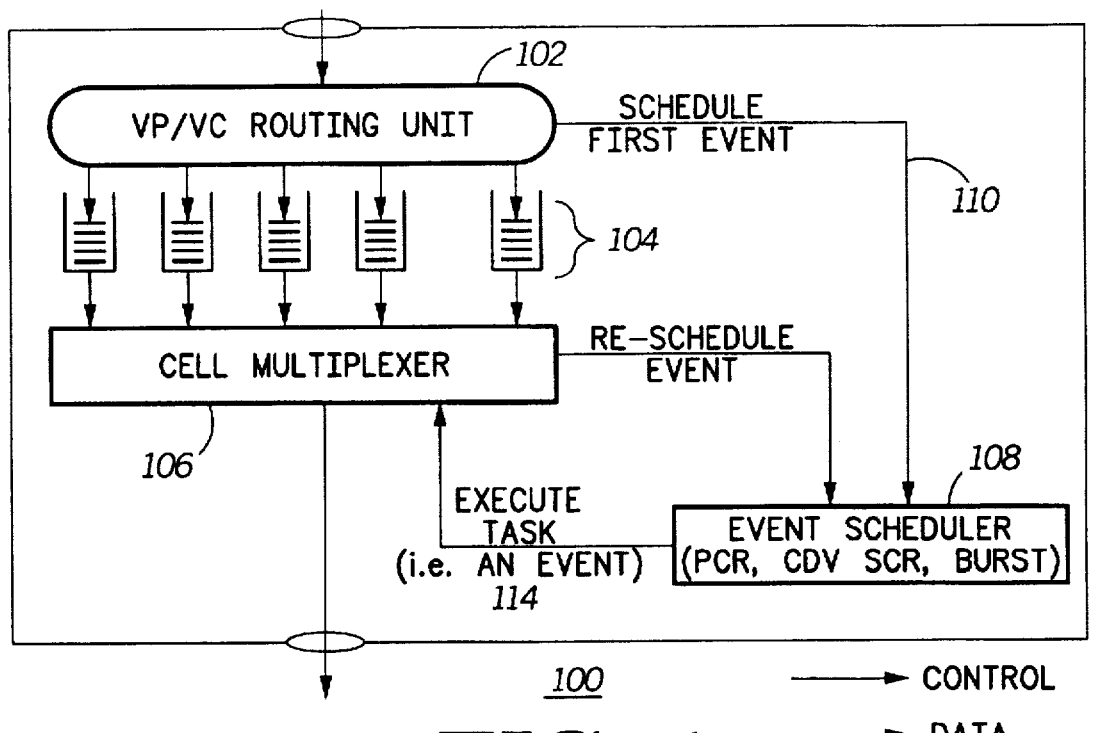
FIG. 1 is a block diagram of an event-driven VP/VC (virtual path/virtual circuit) multiplexer having an event scheduler in accordance with the present invention.

ATM is a network data transmission system and methodology/protocol and is described in the *ATM User-Network Interface Specification*, Version 3.0, by the ATM Forum, published by Prentice-Hall in 1993 and related specifications and other publications authored by the ATM Forum. ATM enables diverse information traffic types, such as voice/audio, data and video to efficiently share a common transmission path and switching elements in Virtual Connections (VCs) therethrough between ATM traffic sources and destinations. All ATM traffic is formatted into fixed size user cells having defined headers (interpreted by the ATM network for controlling the switching the cells through the network) and payloads (containing user data, not interpreted by the network), so that diverse transmission rates may be accommodated without complex synchronization functions. ATM has the potential for supporting diverse traffic with differing tolerances for delay, jitter and cell loss, and differing requirements for bandwidth or throughput.

In this regard, ATM networks are specified to support a number of traffic service categories, including Constant Bit Rate (CBR), Variable Bit Rate (VBR), Available Bit Rate (ABR) and Unspecified Bit Rate (UBR). The different service categories each have associated ATM traffic parameters which describe the time series of cells emitted by the various types of sources. CBR sources are described by the following two traffic descriptors: a Peak Cell Rate (PCR), which is the maximum rate that the source will emit cells, and a Cell Delay Variation (CDV) which is the amount of cell jitter, or variance from uniformly spaced cells (in time). VBR sources are described by a PCR, a Maximum Burst Size (MBS) which is the maximum number of cells which will be sent at a rate equal to the PCR (before a subsequent idle period), and a Sustainable Cell Rate (SCR) which is roughly equivalent to a long term average cell rate. ABR sources are described by a PCR and an Minimum Cell Rate (MCR) which is a minimum cell rate that the ABR source has contracted with the network (i.e., an ABR is always allowed to emit cells at a rate that is at least as large as the MCR). Furthermore, the ABR source may operate at an Actual Cell Rate (ACR) which is between the PCR and the MCR. The ACR is explicitly controlled (throughout the duration of the call) by the network. UBR sources have no traffic descriptors and therefore the behavior of UBR sources is totally unspecified and unknown (to the network).

In general, the ATM system architecture is designed such that an ATM network can mix traffic from these various service categories onto a single common physical network link (transmission media) while guaranteeing specific Quality of Service (QoS) guarantees to the diverse traffic sources. CBR sources are guaranteed by the ATM network, provided a source doesn't exceed its traffic contract (described by traffic parameters PCR and CDV) that the network will deliver all cells to the final destination with a guaranteed maximum cell delay (maximum time between the time a cell is emitted at a source to the time that the cell is delivered to the destination) with a small Cell Loss Ratio (CLR) and with a specified CDV' at the destination (where CDV' is usually on the order of the source's CDV, though usually somewhat larger) and specified guaranteed CLR, where typical CLRs are on the order of $10^{-3}$ to $10^{-12}$).

VBR sources are guaranteed, provided that a source doesn't exceed its traffic contract (described by traffic parameters PCR, SCR, and MBS), that the network will deliver all cells to the final destination with a small CLR and with a guaranteed mean cell transfer delay, which is roughly equivalent to an average delay through the network.

ABR sources are guaranteed, provided that a source doesn't exceed its traffic contract (described by traffic parameters PCR and MCR) and provided that the source responds appropriately (per ABR reference behavior) to the explicit rate network feedback, adjusting its ACR accordingly, that the network will deliver all cells to the final destination with a small CLR. Furthermore, ABR sources are guaranteed, by the network, that available network capacity will be "fairly" shared among all ABR sources which may be emitting cells during a specific time instant.

CBR and real time VBR traffic categories are intended to address applications, e.g., circuit emulation and entertainment quality video, with precisely defined requirements for throughputs and delays. The UBR traffic category is intended for applications like data file transfers with minimal service requirements. Although UBR traffic is supported, there are no service guarantees for UBR connections. If bandwidth is available on the ATM network or any ATM link of the network after allocation among CBR, VBR, and ABR traffic, UBR traffic will be accommodated. A network operator may also gratuitously guarantee that a certain percentage of the network capacity is reserved for UBR sources.

The ABR traffic service category is intended to economically support applications with vague requirements for throughputs and delays, particularly traffic from certain types of data sources (data applications), where a specific set of traffic parameters, such as a required SCR or MBS, or a specific guaranteed QoS parameter (such as a maximum and/or mean cell delay) cannot be readily defined. The nature and constraints of the ABR service category as presently envisioned is described further by F. Bonomi in "The Available Bit Rate Service", 53 *Bytes* (The ATM Forum Newsletter), v. 3, n. 4, October 1995, incorporated herein by reference. Further information on the service categories, traffic parameters, and quality of service parameters may be found in the "Traffic Management Specification", Version 4.0, ATM Forum/95-0013R10, Straw Vote, February 1995, incorporated herein by reference.

The present invention solves the problem of mixing multiple service categories on the same physical link or media by utilizing an event scheduler, i.e., a calendar queue, or event scheduling method. The event scheduler may be embodied in software, hardware and firmware.

An event is defined as the process of removing a cell from a queue and the subsequent transmission of the cell on a link of an ATM network. A task is defined as a "scheduled" event. A task object has a predetermined number of parameters associated with it, such as a desired execution time, a queue identification, i.e., queue ID, that indicates which data queue will be serviced when the task is executed, and a task priority. That is, there may be many pending tasks waiting for execution. The execution of a task at a specific time instant is equivalent to an event.

FIG. 1, numeral 100, is a block diagram of an event-driven VP/VC (virtual path/virtual connection) multiplexer having an event scheduler in accordance with the present invention. Cells arrive at the VP/VC routing unit (102), typically a multiplexer, and are routed to a queue of a plurality of queues (104) utilizing a cell multiplexer, in accordance with the information in the cell header. Where the queue is not presently empty when the cell arrives, the cell is added to the queue. Where the queue is empty, the cell is added to the queue, and a request to schedule a first event (110) is made to the event scheduler (108).

This request results in a task being generated and stored (queued) inside the event scheduler. Each task typically includes at least: a desired execution time that indicates the earliest execution time, a queue identification (ID) field, and a priority field. The task is executed at a time equal to or greater than the time stamp that is associated with the task. The priority field is used to resolve contention between tasks with the same time stamp (i.e., the highest priority task will execute first). The queue ID field includes information specifying which data queue will be serviced when the task is executed. The output of the event scheduler consists of events (114). An event is generated when the event scheduler executes a task. The event contains a queue number (queue ID). The event is then sent to the cell multiplexer (106). The cell multiplexer requests the cell from the queue indicated by the queue ID; the cell is sent via the cell multiplexer (106) to the outgoing ATM port and tests the queue after removing the cell to determine whether the queue is empty. Where the queue is unempty, then the cell multiplexer sends a request, where the request includes the queue ID. Other information necessary for developing an optimum scheduler may also be sent, such as the cell loss priority (CLP) bit of the next cell in the queue. The CLP bit indicates whether the cell is to be considered a high priority or low priority cell if and when the network is congested and some cells may need to be discarded.

The event scheduler (108) generates an event (114) when it executes a task. The event is a request for a cell from a specific queue.

The requests to schedule an event are typically received from two external sources, e.g., the VP/VC Routing subsystem (the enqueuing process) and the cell multiplexing subsystem (the dequeuing process). Requests to schedule an event result in the generation of a task object inside the event scheduler. At any particular time instant, each data queue has at most one associated task object inside the event scheduler, i.e., a pending task. Thus, where a queue is empty, there is no associated pending task waiting inside the event scheduler. If the queue is non-empty, then there is one and only one associated pending task in the event scheduler. The maximum number of tasks in the event scheduler at any time instant is equal to the number of queues, and the minimum number of tasks in the event scheduler is zero.

To generate and execute a task, a request to schedule/reschedule an event, wherein the request includes a queue ID, is sent to the event scheduler. Typically, the queue ID is used as an index to a predetermined set of leaky bucket parameters associated with a shaper for an associated queue. A leaky bucket algorithm is known in the art and is defined in the "ATM User-Network Interface Specification", Rev 3.0, The ATM Forum, PTR Prentice Hall, 1993, pages 77–89. Then leaky bucket-like algorithms are executed to provide a "desired task execution time" and a task priority. In general, for all service categories, the computed desired task execution time is the earliest allowed time for transmitting the next data cell for a virtual connection (VC) without violating the traffic contract associated with the VC. For example, for the CBR service category, the PCR and CDV specify the required spacing in time between a time series of cells. For the VBR service category, the PCR, SCR, and MBS traffic parameters specify a conforming traffic source. A task data object, which contains an implicit time stamp indicating the desired execution time, task priority, and queue ID is input to the real time task scheduler/calendar queue. The real time task scheduler stores the task object until the desired task execution time. When the cell counter (220), i.e., a real time clock, increments to the desired time of the pending task, the real time task scheduler moves the pending task into the corresponding priority queue. At each cell clock, a priority decoder/multiplexer removes a single task from the priority queues using, e.g., head of line priority (HOLP). The queue ID is passed through the external interface to the cell multiplexer. Thus, the event scheduler sends a time series of events to the cell multiplexer, where the series of events are a set of queue IDs that specify a valid sequence of cells that fulfill predetermined traffic contracts for every VPC/VCC (virtual path connection/virtual circuit connection). Traffic shaper calculations are implemented in the desired task execution time unit (204).

Figure 2:
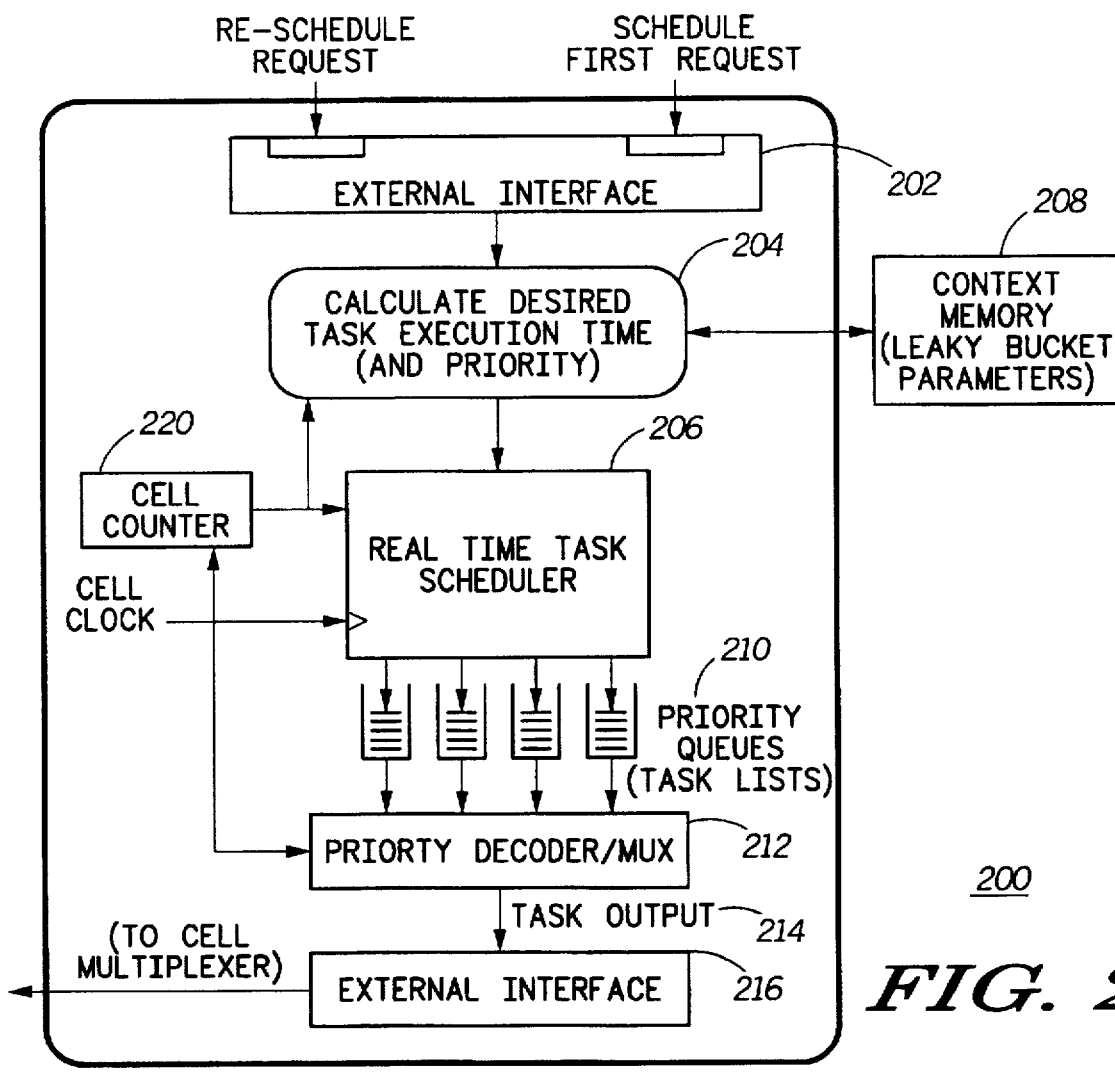
FIG. 2 is a block diagram of an event scheduler in accordance with the present invention.

FIG. 2, numeral 200, is a block diagram of an event scheduler in accordance with the present invention. In the preferred embodiment of the present invention, cells are enqueued in per connection data queues in one or more cell memories. Then the "first arrival" cells are broadcast to an external interface (202) of the scheduler so that the scheduler schedules a first request. A "first arrival" cell is defined to be a cell that arrived at an empty data queue. Then the history of the arrival time, past transmission times, service category, and present state information are used to calculate (204) the "earliest" transmission time for the next cell, which transmission time is inserted into a real time task scheduler (206). Typically, the queue ID is used as an index to a predetermined set of leaky bucket parameters (208) utilized for a shaper for an associated queue (104). The real time task scheduler stores the task object until the desired task execution time (TIME EARLIEST). When the cell counter (220), i.e., a real time clock, increments to the desired time of the pending task, the real time task scheduler moves the pending task into a priority queue. The output of the real time task scheduler (206) is sorted into a set of priority task queues (210). The priority task queues are then serviced in a head of line priority manner, or in a WRR manner utilizing a priority decoder/Multiplexer (212) to provide a task output (214) to an external interface (216). The external interface (216) sends a request for the cell to the cell multiplexer (106). The choice of service is based on a tradeoff of implementation complexity and product requirements.

For each transmission cell slot, the highest priority task is chosen and used to generate a request to service an appropriate data queue, i.e., to fetch one data cell from a specific queue. Where the queue is unempty, then, in accordance with a cell counter (220), the calculation of the "earliest" transmission time for the next cell from the same queue is determined.

Figure 3:
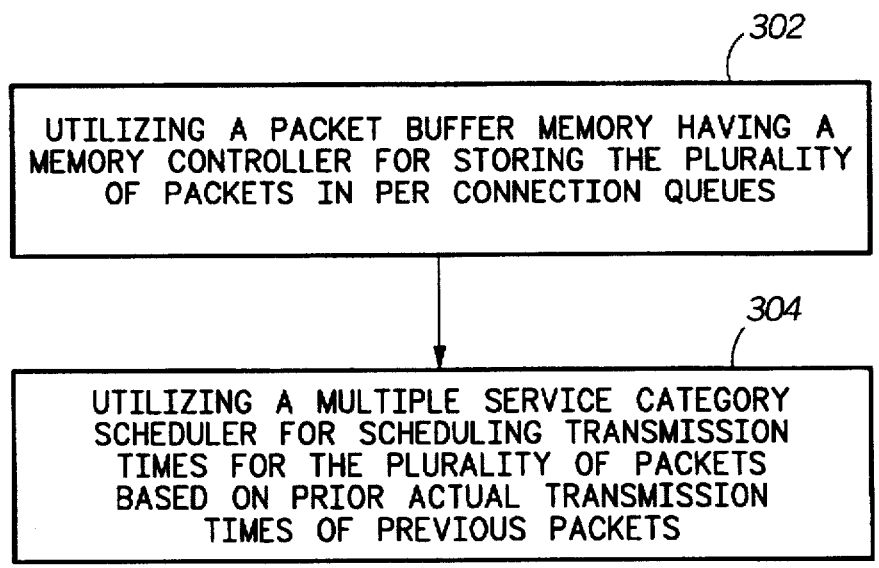
FIG. 3 is a flow chart showing one embodiment of steps for a method for scheduling transmission times for a plurality of cells on an outgoing link for a communication network in accordance with the present invention.

FIG. 3, numeral 300, is a flow chart showing one embodiment of steps for a method for scheduling transmission times for a plurality of cells on an outgoing link for a communication network in accordance with the present invention. The method includes: A) utilizing a cell buffer memory having a memory controller for storing the plurality of cells in per connection queues (302); and B) utilizing a multiple service category scheduler for scheduling transmission times for the plurality of cells based on prior actual transmission times of at least one previous cell (304). Typically, the communication network is an asynchronous transmission mode network. The cell buffer memory may be located in an ingress port, an egress port, or a central memory of a centrally buffered switch.

Figure 4:
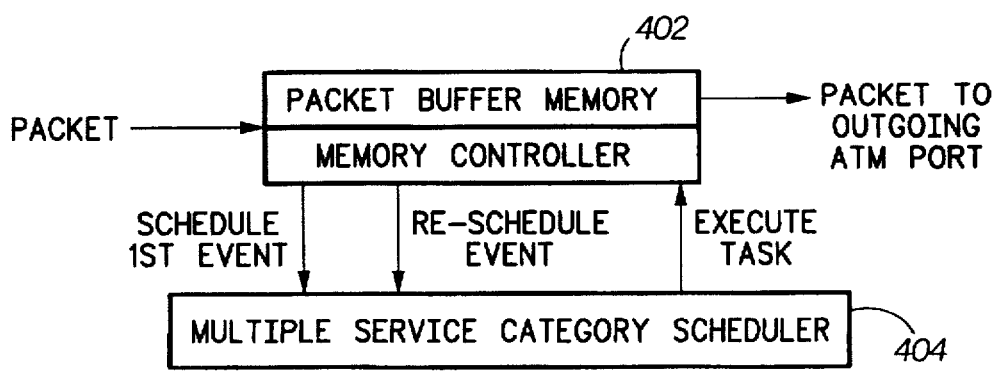
FIG. 4 is a block diagram of an event scheduler for scheduling transmission times for a plurality of cells on an outgoing link for a communication network in accordance with the present invention.

FIG. 4, numeral 400, is a block diagram of an event scheduler for scheduling transmission times for a plurality of cells on an outgoing link for a communication network in accordance with the present invention. The event scheduler includes at least a first cell buffer memory (402) having a memory controller, coupled to receive the plurality of cells, for storing the cells in per connection queues, scheduling first events, and re-scheduling events; and at least a first multiple service category scheduler (404), coupled to the at least first cell buffer memory, for scheduling transmission times for the plurality of cells based on prior actual transmission times of previous cells. The communication network is an asynchronous transmission mode network. Generally, the cell buffer memory is located in an ingress port of a switch, an egress port of a switch, or a central memory of a switch wherein the switch is centrally buffered.

The memory controller (402) typically includes one or more of the following capabilities: 1) memory allocation between a plurality of logical cell data queues, 2) link list processing for implementing per VC and/or per service category cell data queues, and 3) congestion control mechanisms which can include the marking and or discard of cells originating from sources which are not compliant with their negotiated traffic contracts.

The multiservice category scheduler (404) typically includes a calculation unit (204), for calculating a desired transmission time of each cell and outputting a task; at least a first real time task scheduler (206), coupled to calculation unit (204), for using the desired transmission time to generate a task at the desired transmission time and placing the task into a set of priority task queues (210); a priority decoder/MUX (212), coupled to the at least a first real time task scheduler (206), for, at a transmission opportunity, removing at most one task from the set of priority task queues and outputting a request to the memory controller (402) to service a specific cell queue. A cell clock (218) is typically coupled to the real time task scheduler (206), the priority decoder/MUX, and the cell counter (220) to signal the priority decoder/MUX to remove a single task from the priority queues. The cell counter (220) is a real time clock which, when incremented to the desired time of the pending task, signals the real time scheduler (206) to move the pending task into a corresponding priority queue. The cell counter value (Time Now) is also made available to the calculation unit (204) for calculation of the desired transmission times (Time Earliest) of cells.

Figure 5:
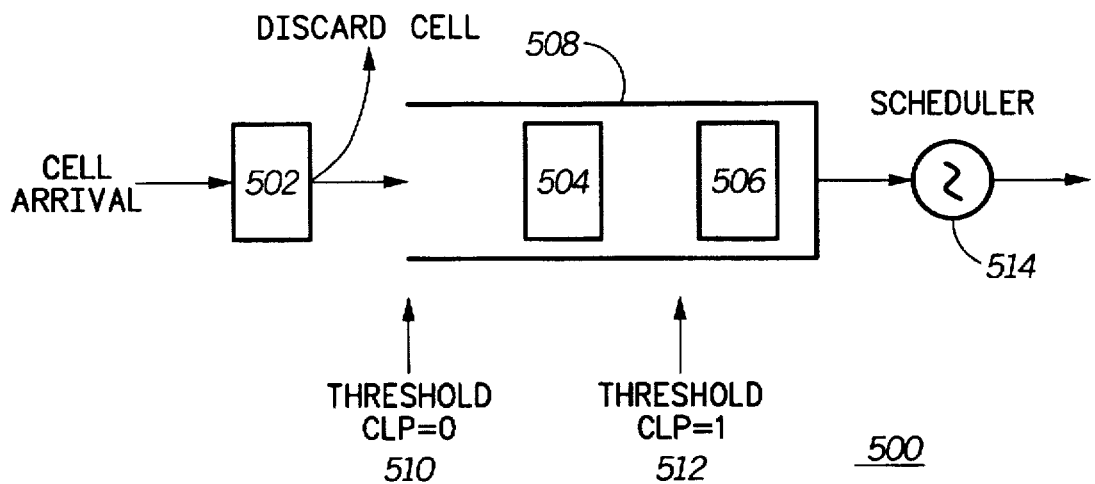
FIG. 5 is a functional view of the event scheduler for scheduling transmission times for a plurality of cells on an outgoing link for a communication network in accordance with the present invention.

FIG. 5, numeral 500, is a functional view of the event scheduler for scheduling transmission times for a plurality of cells on an outgoing link for a communication network in accordance with the present invention. The memory controller (402) partitions the cell buffer memory (402) into per virtual connection queues (508). In FIG. 5, only one logical queue is shown ( for clarity), but in specific embodiments, the memory controller would typically partition the memory into multiple logical queues, where the queues may be either one queue per virtual connection, or possibly, one queue per service category.

Other possibilities exist. Furthermore, the partition of cell buffer memory (402) into logical data queues (508) may be fixed length queues, or variable length queues when the memory controller (402) includes dynamic memory allocation capability through use of well known link list data structures.

When a cell (502) arrives at the cell memory (402), the memory controller makes a decision to either store the cell in the logical queue (508), or else, to discard the cell. The operation of discarding a cell is implemented by not storing the cell in the cell buffer memory (402). This would result in the "loss" of the cell by the network as far as the ultimate destination is concerned, and should be avoided whenever possible. The discard decision may, for example, be based upon a simple threshold (510) which specifies the maximum length allowed for a logical data queue (508). If storing the data cell would cause the queue to exceed the maximum queue length specified by threshold (510), then the cell is discarded, else, the cell is stored in the cell buffer memory. The discard decision may also be selective. For example, if the cell (502) contains a CLP (cell discard priority bit), then the state of the CLP bit in the cell (502) may result in the memory controller (402) using one of two different queue thresholds (i.e., 510 or 512) to decide whether or not the cell (502) should be stored in the logical queue (508). For example, consider the case illustrated in FIG. 5 where cells (504; 506) are already stored in cell queue (508) when cell (502) arrives. If the CLP bit in cell (502) is equal to "1", then the memory controller will use threshold (512) to make the discard decision, and the resulting decision will be to discard the cell. If the CLP bit in the cell (502) is equal to "0", then the memory controller will use the threshold (510) to make the discard decision, and the resulting decision will be to store the cell.

In FIG. 5, the scheduler (514) is shown as a "clock" which paces or governs the cell transmission times from the logical data queues (508). Logically, the scheduler can be view as the device which fetches the cells from the cell buffer.

Figure 6:
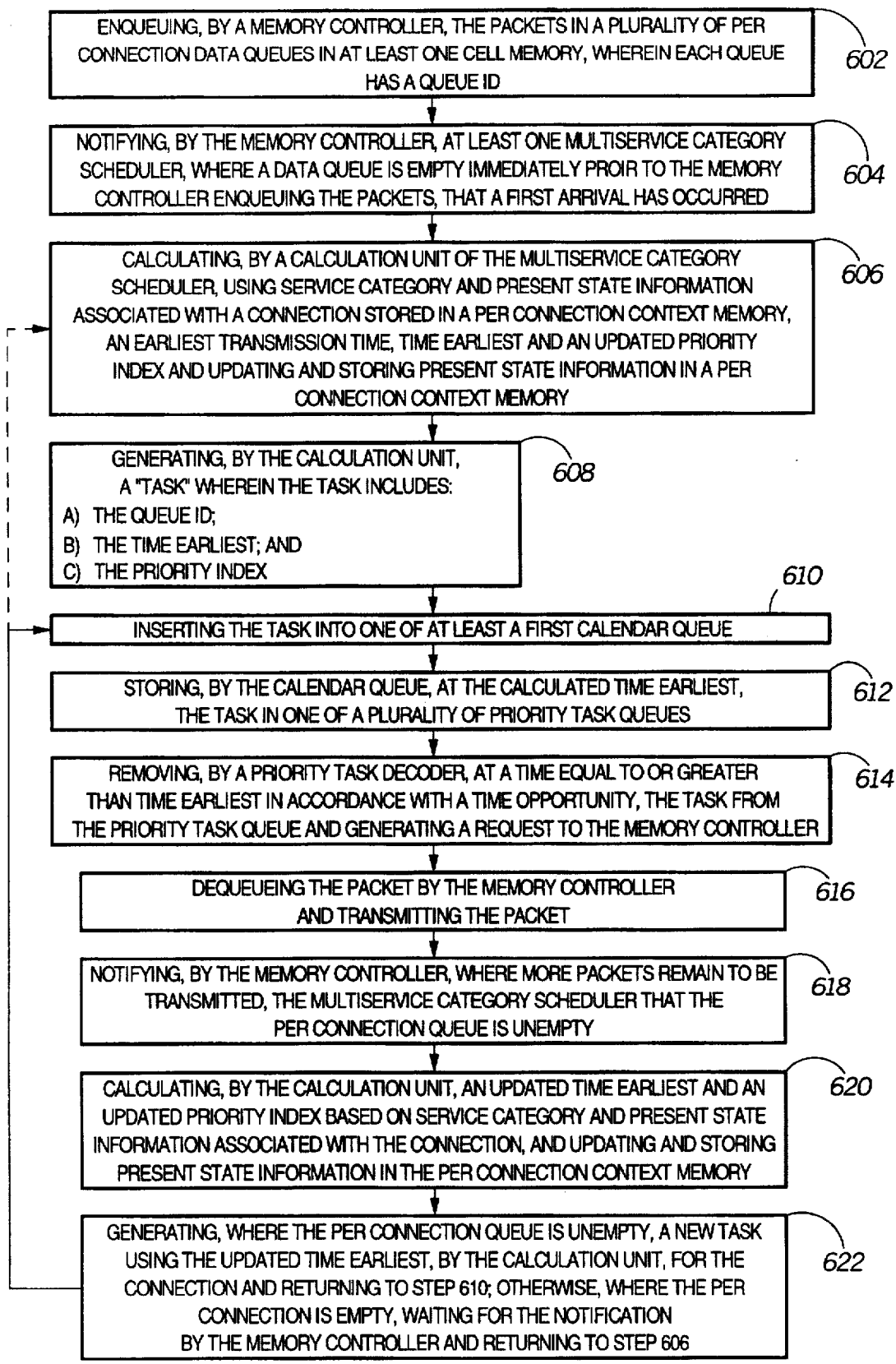
FIG. 6 is a flow chart showing another embodiment of steps of a method for scheduling transmission times for a plurality of cells on an outgoing link for a communication network in accordance with the present invention.

FIG. 6, numeral 600, is a flow chart showing another embodiment of steps of a method for scheduling transmission times for a plurality of cells on an outgoing link for a communication network in accordance with the present invention. The method includes the steps of: A) enqueuing (or discarding if the data queue is congested) (602), by a memory controller, the cells in a plurality of per connection data queues in at least one cell memory, wherein each queue has a queue ID; B) notifying (604), by the memory controller, at least one multiservice category scheduler, where a data queue is empty immediately prior to the memory controller enqueuing the cells, that a first arrival has occurred; C) calculating (606), by a calculation unit of the multiservice category scheduler, using service category and present state information associated with a connection stored in a per connection context memory, an earliest transmission time, TIME EARLIEST and an updated PRIORITY INDEX and updating and storing present state information in a per connection context memory; D) generating (608), by the calculation unit, a "task" wherein the task includes: D1) the queue ID; D2) the TIME EARLIEST; and D3) the PRIORITY INDEX; E) inserting (610) the task into one of a least a first calendar queue; F) storing (612), by the calendar queue, at the calculated TIME EARLIEST, the task in one of a plurality of priority task queues; G) removing (614), by a priority task decoder, at a time equal to or greater than TIME EARLIEST in accordance with a time opportunity, the task from the priority task queue and generating a request to the memory controller; H) dequeueing (616) the cell by the memory controller and transmitting the cell; I) notifying (618), by the memory controller, where more cells remain to be transmitted, the multiservice category scheduler that the per connection queue is unempty; J) calculating (620), by the calculation unit, an updated TIME EARLIEST and an updated PRIORITY INDEX based on service category and present state information associated with the connection, and updating and storing present state information in the per connection context memory; K) generating (622), where the per connection queue is unempty, a new task using the updated TIME EARLIEST, by the calculation unit, for the connection and returning to step E, and otherwise, where the per connection queue is empty, waiting for the notification (604) by the memory controller and returning to step C.

Figure 7:
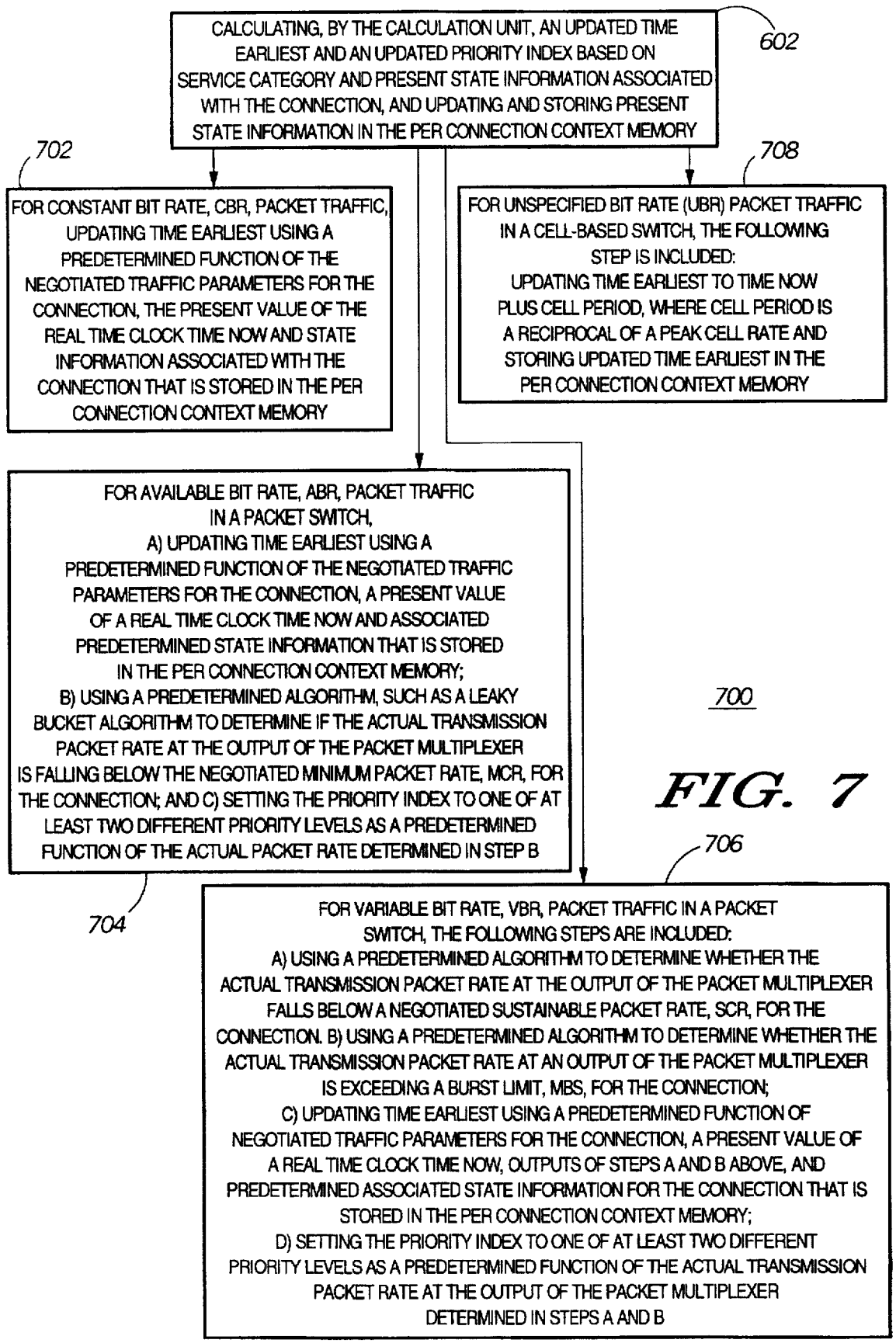
FIG. 7 shows additional steps for utilizing the method of the present invention in constant bit rate (CBR), available bit rate (ABR), variable bit rate (VBR), and unspecified bit rate (UBR) packet traffic in a cell-based switch.

FIG. 7, numeral 700, shows additional steps for utilizing the method of the present invention in constant bit rate (CBR), available bit rate (ABR), variable bit rate (VBR), and unspecified bit rate (UBR) packet traffic in a cell-based switch. For constant bit rate, CBR, packet traffic in a packet switch, step 620 includes (702) updating TIME EARLIEST using a predetermined function of one or more of the negotiated traffic parameters for the connection (PCR, CDV), the present value of the real time clock TIME NOW and state information associated with the connection that is stored in the per connection context memory. For available bit rate, ABR, packet traffic in a packet switch, the following steps (704) are included in step 620: A) updating TIME EARLIEST using a predetermined function of the negotiated traffic parameters for the connection (i.e., the negotiated PCR and MCR), the present value of a real time clock TIME NOW and associated predetermined state information (such as the previously computed TIME EARLIEST) that is stored in the per connection context memory; B) using a predetermined algorithm, such as a leaky bucket algorithm, to determine if the actual transmission packet rate at the output of the packet multiplexer is falling below the negotiated minimum packet rate, MCR, for the connection; and C) setting the PRIORITY INDEX to one of at least two different priority levels as a predetermined function of the actual packet rate determined in step B. For variable bit rate, VBR, packet traffic in a packet switch, the following steps (706) are included in step 620: A) using a predetermined algorithm to determine whether the actual transmission packet rate at the output of the packet multiplexer falls below a negotiated sustainable packet rate, SCR, for the connection; B) using a predetermined algorithm to determine whether an actual transmission packet rate at an output of the packet multiplexer is exceeding a burst limit, MBS, for the connection; C) updating TIME EARLIEST using a predetermined function of one or more of the negotiated traffic parameters for the connection (PCR, CDV, SCR, MBS), a present value of a real time clock TIME NOW, outputs of steps A and B above, and predetermined associated state information for the connection that is stored in the per connection context memory; and D) setting the PRIORITY INDEX to one of at least two different priority levels as a predetermined function of the actual transmission packet rate at the output of the packet multiplexer determined in steps A and B. For UBR packet traffic in a packet switch, step 620 includes updating (708 TIME EARLIEST to TIME NOW plus packet period, where packet period is a reciprocal of a peak packet rate and storing updated TIME EARLIEST in the per connection context memory.

Figure 8:
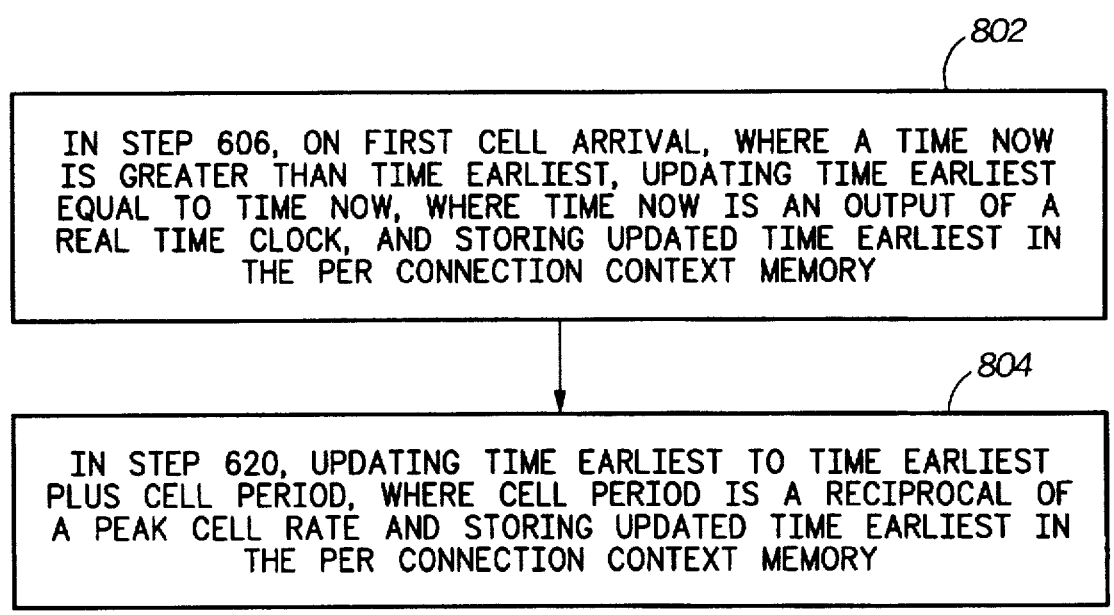
FIG. 8 shows additional steps for utilizing the method of the present invention in constant bit rate (CBR) packet traffic in a cell-based switch.

Also, as shown in FIG. 8, numeral 800, for constant bit rate (CBR) packet traffic in a cell-based switch, the following steps are included: A) in step 606, on first cell arrival, where a TIME NOW is greater than TIME EARLIEST, updating (802) TIME EARLIEST equal to TIME NOW, where TIME NOW is an output of a real time clock, and storing updated TIME EARLIEST in a per connection context memory and B) in step 620, updating (804) TIME EARLIEST to TIME EARLIEST plus cell period, where cell period is a reciprocal of a peak cell rate and storing updated TIME EARLIEST in the per connection context memory. The PRIORITY INDEX value of steps 606 and 620 of FIG. 6 is typically initialized to a fixed CBR-priority value and remains unchanged.

Figure 9:
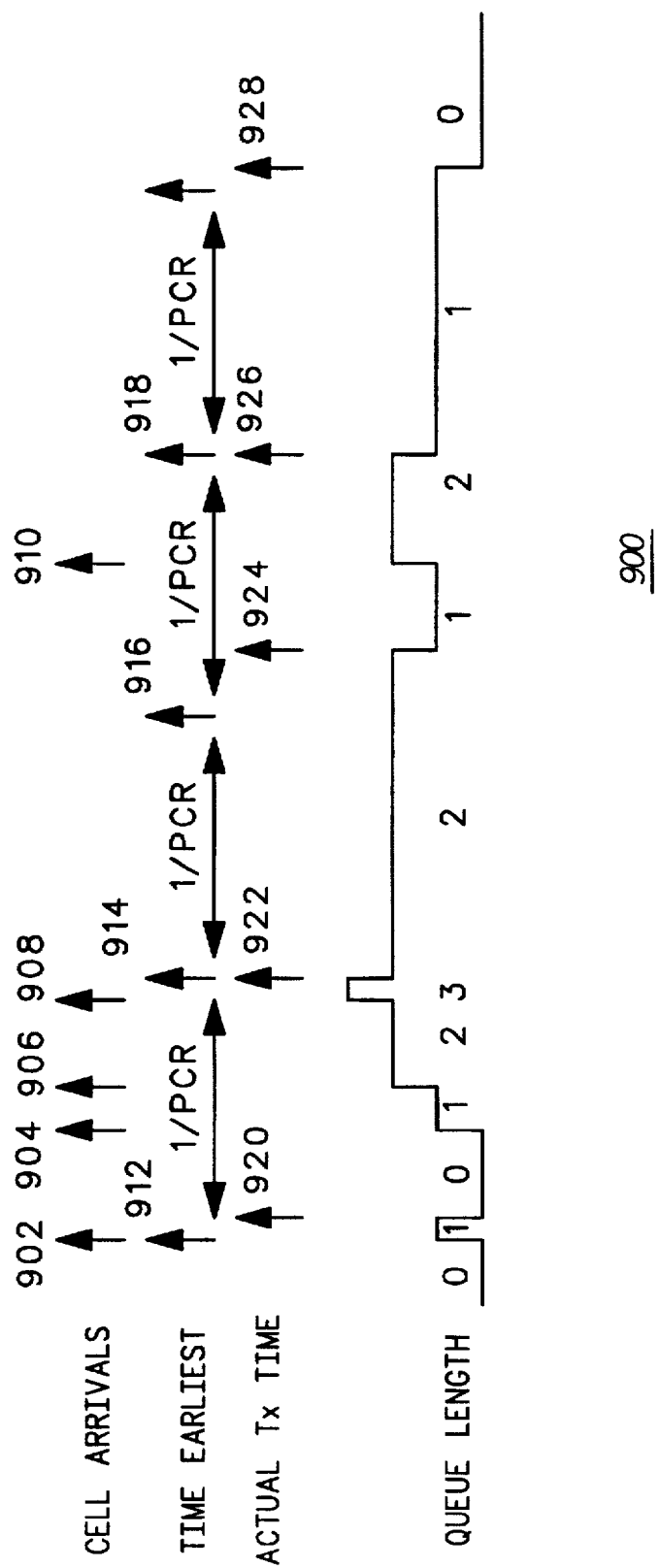
FIG. 9 illustrates a timeline for the operation of a Scheduler utilizing the specific steps of FIG. 8 for a CBR connection.

FIG. 9, numeral 900, illustrates a timeline for the operation of a Scheduler utilizing the specific steps of FIG. 8 for a CBR connection. Arrows (902, 904, 906, 908 and 910) denote cell arrival times, where time is assume to evolve from left to right. In the first step (802) of FIG. 8, on first arrival (902), where TIME NOW is assumed to be greater than a previously computed or initialized TIME EARLIEST, TIME EARLIEST (912) is set to the value of TIME NOW when the cell (910) arrived. The cell which arrived at time zero (902) is shown as being transmitted at an actual time (920). Note that the transmission time (920) is shown to be slightly after the scheduled time (912). This would occur due to possible contention in priority queues (210) in the scheduler (200). However, for the CBR traffic class which typically has highest priority in the priority decoder (212), the delay between the scheduled time (912) and actual transmission time (920) may be engineered to be small. At the actual transmission time (920), when the cell is transmitted, TIME EARLIEST is updated per the second step of FIG. 8 (804) to time TIME EARLIEST plus the reciprocal of the PCR. Thus, the calculated TIME EARLIEST for the second cell (904) is after a time period of 1/PCR (914). This process continues until the data queue is empty. In the illustration, five cells are shown arriving to the queue, and five computed TIME EARLIEST and five actual transmission times are illustrated. The salient features illustrated are the following: 1) The scheduler smoothes CBR traffic in the sense that the cells are transmitted in an almost perfectly evenly spaced time intervals (1/PCR) even when the cells arrive with considerable cell jitter. This is possible through the use of the per VC cell queue, buffering a few cells (note cell length illustrated in FIG. 9) and the Scheduler which paces cells out at the uniformly spaced scheduled transmission times (TIME EARLIEST). 2) The combination of the per VC data queues implemented by the memory controller and the scheduler also isolates various traffic sources in a data network, guaranteeing that sources which obey their traffic contract will not be affected by sources which violate their traffic contract. This may be observed from FIG. 9 by noting what happens to the queue length when three closely spaced cells (904, 906, and 908) arrive. The queue length starts to increase. In the illustrated case (FIG. 9), the queue length does not continue to grow to a large value because the average cell rate over several cell time periods does not exceed the PCR. However, if a source continued to send at a rate exceeding the PCR for a sustained period of time, the queue length would continue to grow since the Scheduler would limit the out going rate to the negotiated PCR. If the memory control sets the queue threshold value (510) to a small value (a few cells for CBR service category), then the memory controller will discard cells from non-compliant sources.

Figure 10:
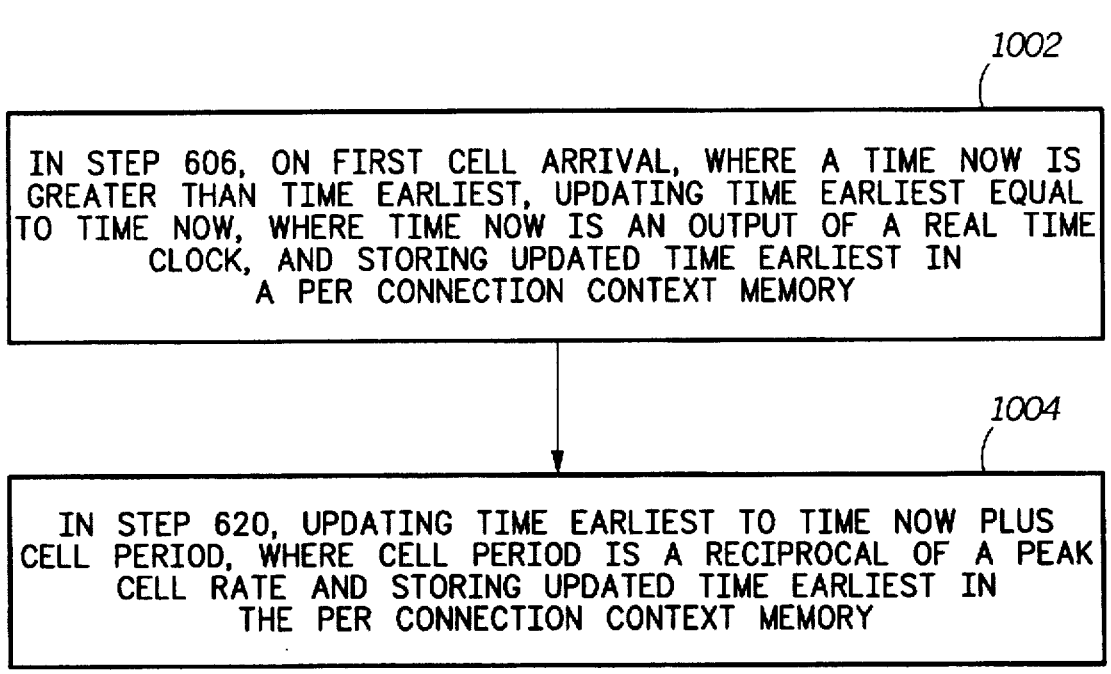
FIG. 10 shows additional steps for utilizing the method of the present invention in unspecified bit rate (UBR) packet traffic in a cell-based switch.

As shown in FIG. 10, numeral 1000, for unspecified bit rate (UBR) packet traffic in a cell-based switch, the following steps are included: A) in step C, on first cell arrival, where a TIME NOW is greater than TIME EARLIEST, updating (1002) TIME EARLIEST equal to TIME NOW, where TIME NOW is an output of a real time clock, and storing updated TIME EARLIEST in a per connection context memory and B) in step J, updating (1004) TIME EARLIEST to TIME NOW plus cell period, where cell period is a reciprocal of a peak cell rate and storing updated TIME EARLIEST in the per connection context memory. The PRIORITY INDEX value of steps 606 and 620 of FIG. 6 is typically initialized to a fixed UBR-priority value and remains unchanged.

Figure 11:
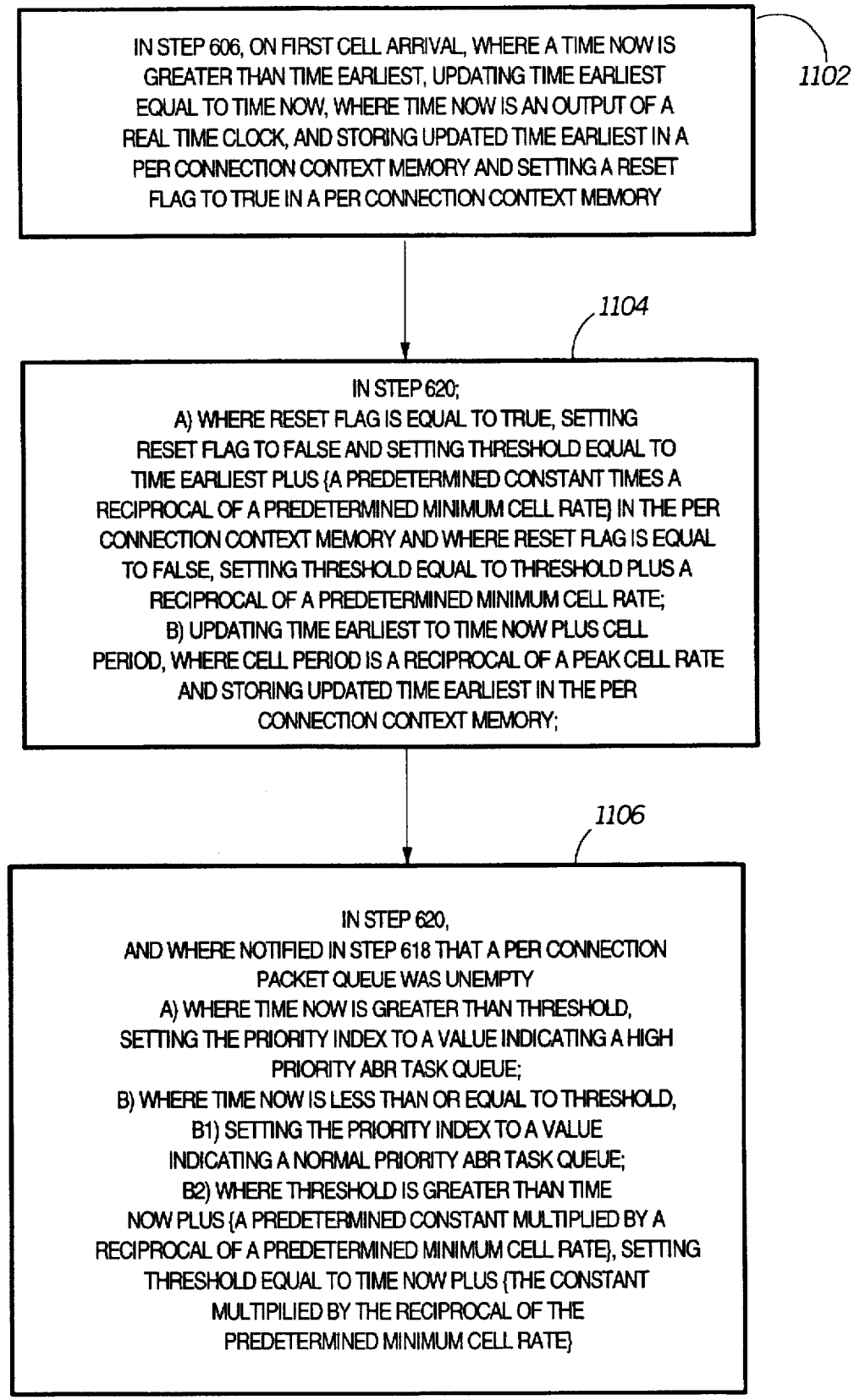
FIG. 11 shows additional steps for utilizing the method of the present invention in available bit rate (ABR) packet traffic in a cell-based switch.

As shown in FIG. 11, numeral 1100, for available bit rate (ABR) packet traffic in a cell-based switch, the following steps are included:

A) in step C (606) of FIG. 6, on first cell arrival, where a TIME NOW is greater than TIME EARLIEST,
   A1) updating (1102) TIME EARLIEST equal to TIME NOW, where TIME NOW is an output of a real time clock, and storing updated TIME EARLIEST in a per connection context memory and
   A2) setting a RESET FLAG to TRUE in a per connection context memory;

B) in step J (620), including (1104):
   B1) one of B1a–B1b:
      B1a) where RESET FLAG is equal to TRUE, setting RESET FLAG to FALSE and setting THRESHOLD equal to TIME EARLIEST plus {a predetermined constant times a reciprocal of a predetermined minimum cell rate} in the per connection context memory; and
      B1b) where RESET FLAG is equal to FALSE, setting THRESHOLD equal to THRESHOLD plus a predetermined reciprocal of a minimum cell rate;
   B2) updating (1006) TIME EARLIEST to TIME NOW plus cell period, where cell period is a reciprocal of a peak cell rate and storing updated TIME EARLIEST in the per connection context memory; and
   B3) where notified in step I (618) that a per connection cell queue was unempty, including (1106):
      B3a) where TIME NOW is greater than THRESHOLD, setting the PRIORITY INDEX to a value indicating a high priority ABR task queue;
      B3b) where TIME NOW is less than or equal to THRESHOLD, B3b1) setting the PRIORITY INDEX to a value indicating a normal priority ABR task queue; and B3b2) where THRESHOLD is greater than TIME NOW plus {a predetermined constant multiplied by a reciprocal of a predetermined minimum cell rate}, setting THRESHOLD equal to TIME NOW plus {the constant multiplied by the reciprocal of the predetermined minimum cell rate}.

Figure 12:
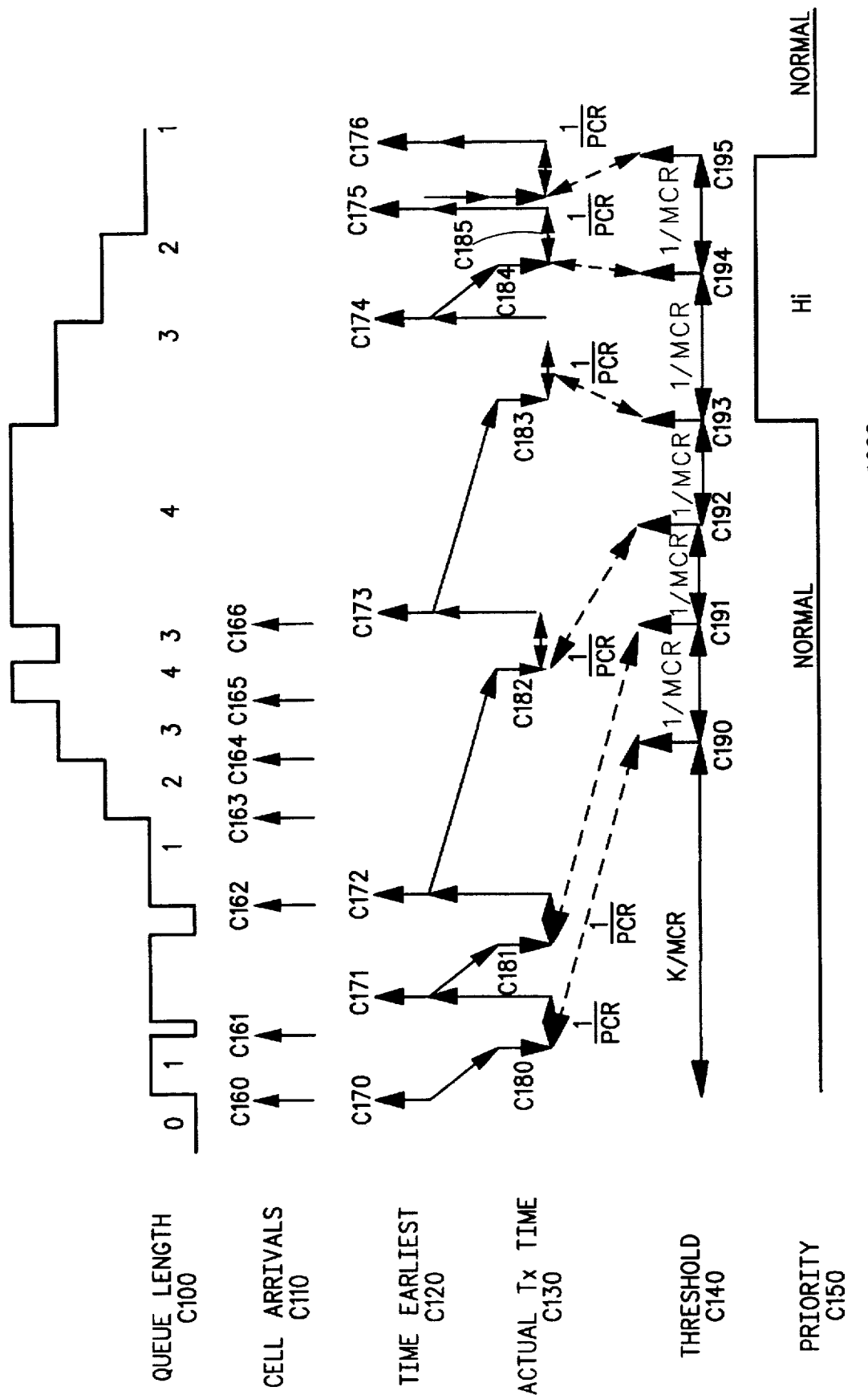
FIG. 12 illustrates a timeline for the operation of a Scheduler utilizing the specific steps of FIG. 11 for an ABR connection.

FIG. 12, numeral 1200, illustrates a timeline for the operation of a Scheduler utilizing the specific steps of FIG. 11 for an ABR connection. ABR traffic parameters PCR (specifying the peak cell rate) and MCR (specifying the minimum cell rate guaranteed by the network) are applicable to ABR. FIG. 12 illustrates a data burst of seven cells arriving to the queue at cell arrival times C160, C161, . . . , C166. In the first step of FIG. 11 (1102), on first arrival C160, where TIME NOW is assumed by be greater than a previously computed or initialized TIME EARLIEST, TIME EARLIEST C170 is set to the value of TIME NOW when the cell C160 arrived. The first cell is actually transmitted at time C180. Again this is often later than the scheduled time C170 due to contention in the priority queues (210) between various connections. Especially for ABR connections, the time between the scheduled transmission times (C170, C171, . . . , C176) and the actual transmission times (C180, C181, . . . , C185) may be considerable, and variable (as illustrated) due to the fact the ABR is typically given lower priority in the priority decoder (212).

When the first cell is actually transmitted C180, the reset flag is True (1104), resulting in the setting of the threshold variable to TIME EARLIEST plus a predetermined constant times the reciprocal of the MCR resulting in a first setting of the Threshold variable to time C190. The scheduler also calculates a new TIME EARLIEST C171. The scheduler determines the priority for the ABR task by comparing the real time clock TIME NOW at the actual transmission time C180 with the just computed value of the THRESHOLD variable C190. If the Threshold value is larger, then the priority is set to Normal_ABR_Priority, otherwise, the priority is set to "Hi_ABR_priority". For the "first" cell illustrated in FIG. 11, the priority is set to "Normal" since the THRESHOLD C190 is larger than TIME NOW C180.

FIG. 12 illustrates the assumed time evolution of the various variables. Note that for the third and fourth cells, that there is a large time delay between the scheduled transmission times (C172 and C173) and the actual transmission times (C182 and C183). This may be caused by a higher priority traffic source (such as a VBR source) starting to transmit a cell, or by multiple other ABR sources starting to transmit cells through the same port resulting in contention in priority queues (210). Note that at actual transmission time C183, that when the scheduler compares the actual present time C183 with the just computed value of the threshold time C193, that the actual TIME NOW is greater than the THRESHOLD, therefore the scheduler has detected that the average cell rate of this ABR connection is falling behind guaranteed MCR for the connection, as a result, the priority C150 for this ABR connection is momentarily increased to Hi_ABR_Priority which will increase the priority of this connection in priority decoder (212). This will decrease the delay between subsequent scheduled transmission times (C174 and C175) and actual transmission times (C184 and C185) until the scheduler detects that the connection is meeting or exceeding its minimum cell rate, at which time the scheduler will decrease the priority to Normal as illustrated.

As shown in FIG. 13, numeral 1300, for variable bit rate (VBR) packet traffic in a cell-based switch, the following steps are included:

A) in step 606 (1302), on first cell arrival, where a TIME NOW is greater than TIME EARLIEST, A1) updating TIME EARLIEST equal to TIME NOW, where TIME NOW is an output of a real time clock, and storing updated TIME EARLIEST in a per connection context memory and A2) setting a RESET FLAG to TRUE in a per connection context memory;

B) in step 620 (1304),

B1) where RESET FLAG is equal to TRUE,

B1a) setting RESET FLAG to FALSE

B1b) and setting THRESHOLD equal to TIME EARLIEST plus {a predetermined constant times a reciprocal of a predetermined sustainable cell rate} in the per connection context memory;

B1c) and where a theoretical transmission time TTT is less than TIME NOW, setting TTT=TIME NOW; and where RESET FLAG is equal to FALSE, setting THRESHOLD equal to THRESHOLD plus a reciprocal of the predetermined sustainable cell rate (SCR);

B2) updating TIME EARLIEST to TIME NOW plus cell period, where cell period is a reciprocal of a predetermined peak cell rate (PCR) and storing updated TIME EARLIEST in the per connection context memory; and B3) where notified in step 618 that a per connection cell queue was unempty, B3a) updating a theoretical transmission time (TTT) to a value of TTT plus the reciprocal of the sustainable cell rate (SCR) and storing the updated TTT in the per connection context memory;

B3b) and one of B3b1–B3b2:

B3b1) TIME NOW is greater than THRESHOLD, setting the PRIORITY INDEX equal to a value indicating a high priority VBR task queue;

and B3b2) where TIME NOW is less than or equal to THRESHOLD,

B3b2a) setting the PRIORITY INDEX equal to value indicating a normal priority VBR task queue;

B3b2b) where THRESHOLD is greater than TIME NOW plus a predetermined constant times a reciprocal of a predetermined sustainable cell rate (SCR), setting THRESHOLD equal to TIME NOW plus a predetermined constant times a reciprocal of a predetermined sustainable cell rate (SCR), B3b2c) where TIME EARLIEST is less than TTT minus a predetermined maximum burst size constant TMBS, setting TIME EARLIEST equal to TTT minus a predetermined maximum burst size constant TMBS.

Figure 14:
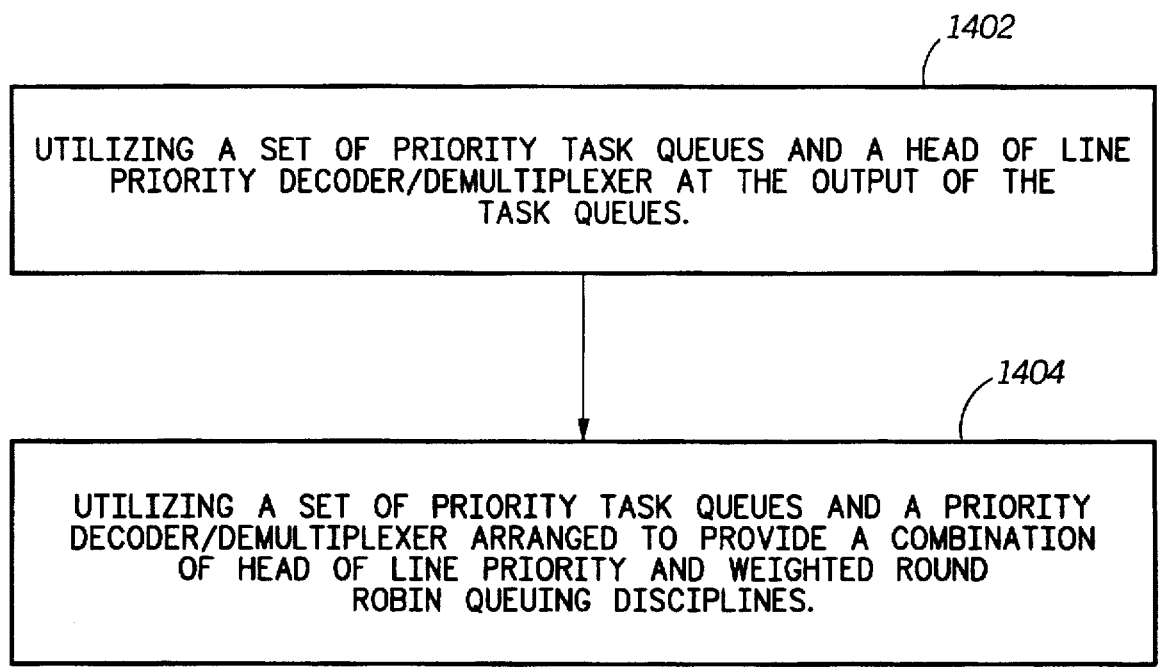
FIG. 14 is a flow chart showing one embodiment of steps for priority decoding in accordance with the present invention.

FIG. 14, numeral 1400, is a flow chart showing one embodiment of steps for priority decoding in accordance with the present invention. The steps include: A) utilizing (1402) a set of priority task queues and a head of line priority decoder/demultiplexer at the output of the task queues; B) utilizing (1404) a set of priority task queues and a priority decoder/demultiplexer arranged to provide a combination of head of line priority and weighted round robin queuing disciplines.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method for scheduling transmission times for a plurality of packets on an outgoing link for a communication network, comprising the steps of:
   A) enqueuing, by a memory controller, the packets in a plurality of per connection data queues in at least one packet memory, wherein each queue has a queue ID;
   B) notifying, by the memory controller, at least one multiservice category scheduler, where a data queue is empty immediately prior to the memory controller enqueuing the packets, that a first arrival has occurred;
   C) calculating, by a calculation unit of the multiservice category scheduler, using service category and present state information associated with a connection stored in a per connection context memory, an earliest transmission time, TIME EARLIEST and an updated PRIORITY INDEX and updating and storing present state information in a per connection context memory;
   D) generating, by the calculation unit, a "task" wherein the task includes:
      D1) the queue ID;
      D2) the TIME EARLIEST; and
      D3) the PRIORITY INDEX;
   E) inserting the task into one of at least a first calendar queue;
   F) storing, by the calendar queue, at the calculated TIME EARLIEST, the task in one of a plurality of priority task queues;
   G) removing, by a priority task decoder, at a time equal to or greater than TIME EARLIEST in accordance with a time opportunity, the task from the priority task queue and generating a request to the memory controller;
   H) dequeueing the packet by the memory controller and transmitting the packet;
   I) notifying, by the memory controller, where more packets remain to be transmitted, the multiservice category scheduler that the per connection queue is unempty;
   J) calculating, by the calculation unit, an updated TIME EARLIEST and an updated PRIORITY INDEX based on service category and present state information associated with the connection, and updating and storing present state information in the per connection context memory;
   K) generating, where the per connection queue is unempty, a new task using the updated TIME EARLIEST, by the calculation unit, for the connection and returning to step E, and otherwise, where the per connection queue is empty, waiting for the notification by the memory controller and returning to step C.

2. The method of claim 1 wherein the step of enqueuing the packets includes determining whether to enqueue/discard a packet in accordance with a predetermined scheme for, where at least one source malfunctions, maintaining a predetermined quality of service for other sources.

3. The method of claim 2 wherein the predetermined scheme includes one of:
   A) discarding a packet where a maximum queue length specified by a threshold is exceeded by storing the packet in a queue; and
   B) discarding the packet in accordance with a predetermined selective scheme.

4. The method of claim 1 including, for constant bit rate, CBR, packet traffic in a packet switch, in step J, updating TIME EARLIEST using a predetermined function of the negotiated traffic parameters for the connection, the present value of the real time clock TIME NOW and state information associated with the connection that is stored in the per connection context memory.

5. The method of claim 1 wherein, for CBR packet traffic in a packet switch, including the steps of:
   A) in step C, on first packet arrival, where a TIME NOW is greater than TIME EARLIEST, updating TIME EARLIEST equal to TIME NOW, where TIME NOW is an output of a real time clock, and storing updated TIME EARLIEST in a per connection context memory and
   B) in step J, updating TIME EARLIEST to TIME EARLIEST plus packet period, where packet period is a reciprocal of a predetermined peak packet rate and storing updated TIME EARLIEST in the per connection context memory.

6. The method of claim 1 wherein, for UBR packet traffic in a packet switch, including the steps of:
   A) in step C, on first packet arrival, where a TIME NOW is greater than TIME EARLIEST, updating TIME EARLIEST equal to TIME NOW, where TIME NOW is an output of a real time clock, and storing updated TIME EARLIEST in a per connection context memory and
   B) in step J, updating TIME EARLIEST to TIME NOW plus packet period, where packet period is a reciprocal of a predetermined peak packet rate and storing updated TIME EARLIEST in the per connection context memory.

7. The method of claim 1 wherein, for available bit rate, ABR, packet traffic in a packet switch, the following steps are included:
   A) in step J, updating TIME EARLIEST using a predetermined function of the negotiated traffic parameters for the connection, a present value of a real time clock TIME NOW and associated predetermined state information that is stored in the per connection context memory;
   B) in step J, using a predetermined algorithm, such as a leaky bucket algorithm, to determine if the actual transmission packet rate at the output of the packet multiplexer is falling below the negotiated minimum packet rate, MCR, for the connection; and
   C) in step J, setting the PRIORITY INDEX to one of at least two different priority levels as a predetermined function of the actual packet rate determined in step B.

8. The method of claim 1 wherein, for ABR packet traffic in a packet switch, including the steps of:
   A) in step C, on first packet arrival, where a TIME NOW is greater than TIME EARLIEST,
      A1) updating TIME EARLIEST equal to TIME NOW, where TIME NOW is an output of a real time clock, and storing updated TIME EARLIEST in a per connection context memory and
      A2) setting a RESET FLAG to TRUE in a per connection context memory;
   B) in step J,
      B1) one of B1a–B1b:
         B1a) where RESET FLAG is equal to TRUE, setting RESET FLAG to FALSE and setting THRESH- OLD equal to TIME EARLIEST plus {a predetermined constant times a reciprocal of a predetermined minimum packet rate} in the per connection context memory; and B1b) where RESET FLAG is equal to FALSE, setting THRESHOLD equal to THRESHOLD plus a reciprocal of a predetermined minimum packet rate;

B2) updating TIME EARLIEST to TIME NOW plus packet period, where packet period is a reciprocal of a peak packet rate and storing updated TIME EARLIEST in the per connection context memory; and B3) where notified in step I that a per connection packet queue was unempty, B3a) where TIME NOW is greater than THRESHOLD, setting the PRIORITY INDEX to a value indicating a high priority ABR task queue;

B3b) where TIME NOW is less than or equal to THRESHOLD,

B3b1) setting the PRIORITY INDEX to a value indicating a normal priority ABR task queue; and B3b2) where THRESHOLD is greater than TIME NOW plus {a predetermined constant multiplied by a reciprocal of a predetermined minimum packet rate}, setting THRESHOLD equal to TIME NOW plus {the constant multiplied by the reciprocal of the predetermined minimum packet rate}.

9. The method of claim 1 wherein, for variable bit rate, VBR, packet traffic in a packet switch, the following steps are included:

A) in step J, using a predetermined algorithm to determine whether the actual transmission packet rate at the output of the packet multiplexer falls below a negotiated sustainable packet rate, SCR, for the connection, B) in step J, using a predetermined algorithm to determine whether an actual transmission packet rate at an output of the packet multiplexer is exceeding a burst limit, MBS, for the connection;

C) in step J, updating TIME EARLIEST using a predetermined function of negotiated traffic parameters for the connection, a present value of a real time clock TIME NOW, outputs of steps A and B above, and predetermined associated state information for the connection that is stored in the per connection context memory;

D) in step J, setting the PRIORITY INDEX to one of at least two different priority levels as a predetermined function of the actual transmission packet rate at the output of the packet multiplexer determined in steps A and B.

10. The method of claim 1 wherein, for VBR packet traffic in a packet switch, including the steps of:

A) in step C, on first packet arrival, where a TIME NOW is greater than TIME EARLIEST, A1) updating TIME EARLIEST equal to TIME NOW, where TIME NOW is an output of a real time clock, and storing updated TIME EARLIEST in a per connection context memory and A2) setting a RESET FLAG to TRUE in a per connection context memory;

B) in step J,

B1) one of B1a–B1b:

B1a) where RESET FLAG is equal to TRUE,

B1a1) setting RESET FLAG to FALSE and

B1a2) setting THRESHOLD equal to TIME EARLIEST plus {a predetermined constant times a reciprocal of a predetermined sustainable packet rate} in the per connection context memory;

B1a3) and where a theoretical transmission time TTT is less than TIME NOW, setting TTT= TIME NOW; and B1b) where RESET FLAG is equal to FALSE, setting THRESHOLD equal to THRESHOLD plus a predetermined reciprocal of the predetermined sustainable packet rate;

B2) updating TIME EARLIEST to TIME NOW plus packet period, where packet period is a reciprocal of a peak packet rate and storing updated TIME EARLIEST in the per connection context memory; and B3) where notified in step I that a per connection packet queue was unempty, B3a) updating TTT to a value of TTT plus the reciprocal of the sustainable packet rate and storing the updated TTT in the per connection context memory;

B3b) one of B3b1–B3b2:

B3b1) where TIME NOW is greater than THRESHOLD, setting the PRIORITY INDEX equal to a value indicating a high priority VBR task queue;

B3b2) where TIME NOW is less than or equal to THRESHOLD,

B3b2a) setting the PRIORITY INDEX equal to value indicating a normal priority VBR task queue;

B3b2b) where THRESHOLD is greater than TIME NOW plus a predetermined constant times a reciprocal of a predetermined sustainable packet rate, setting THRESHOLD equal to TIME NOW plus a predetermined constant times a reciprocal of a predetermined sustainable packet rate, and B3b2c) where TIME EARLIEST is less than TTT minus a predetermined maximum burst size constant TMBS, setting TIME EARLIEST equal to TMBS.

11. The method of claim 1 wherein priority decoding includes one of:

A) utilizing a set of priority task queues and a head of line priority decoder/demultiplexer at the output of the task queues;

B) utilizing a set of priority task queues and a priority decoder/demultiplexer arranged to provide a combination of head of line priority and weighted round robin queuing disciplines.

12. A method for scheduling transmission of a packet, the method comprising the steps of:

determining, upon receipt of said packet, a corresponding per-connection queue for said packet;

determining, upon determination of the corresponding per-connection queue, whether said per-connection queue is empty;

generating, upon determination that said per-connection queue is empty, a request for scheduling said packet;

calculating at least a desired execution time and a priority for said request;

storing said request until at least the desired execution time; and storing said request in one of a plurality of priority queues corresponding to the priority calculated for the request.

13. The method of claim 12 further comprising the step of:

selecting one request for each of a plurality of cell transmission times from among a number of requests stored in the plurality of priority queues.

14. The method of claim 13 further comprising the steps of:

retrieving, upon selecting a request, a corresponding packet from its corresponding per-connection queue;

determining, upon retrieving the corresponding packet from its corresponding per-connection queue, whether said per-connection queue is non-empty; and generating, upon determination that said per-connection queue is non-empty, a request for scheduling a next packet from said per-connection queue.

15. An event scheduler for scheduling transmission times for a plurality of packets, the event scheduler receiving a request for each packet to be scheduled, the event scheduler comprising:

a priority queue for each of a plurality of priorities supported by the event scheduler;

logic for calculating at least a desired execution time and a priority for each request; and a real time task scheduler, responsive to a real time clock, for determining when the real time clock is at least equal to the desired execution time of a request and, upon said determination, for storing said request in a corresponding priority queue.

16. The event scheduler of claim 15 further comprising:

a cell clock for signaling each successive cell transmission time; and a decoder/MUX, responsive to the cell clock, for selecting one request for each cell transmission time from among the requests stored in the plurality of priority queues.

17. The event scheduler of claim 16 wherein the selected request corresponds to the request stored at the head of the highest priority non-empty priority queue.

18. An apparatus for scheduling transmission times for a plurality of packets, the apparatus comprising:

a per-connection queue for each of a plurality of connections supported by the apparatus;

logic for determining, upon receipt of each packet, a corresponding perconnection queue for said packet;

logic for determining, upon determination of the corresponding per-connection queue, whether said per-connection queue is empty;

logic for generating, upon determination that said per-connection queue is empty, a request for scheduling said packet;

logic for calculating at least a desired execution time and a priority for said request;

logic for storing said request until at least the desired execution time; and logic for storing said request in one of a plurality of priority queues corresponding to the priority calculated for the request.

19. The apparatus of claim 18 further comprising:

logic for selecting, for each cell transmission time, one request from a number of requests stored in the plurality of priority queues.

20. The apparatus of claim 19 further comprising:

logic for retrieving, upon selecting a request, a corresponding packet from its corresponding per-connection queue;

logic for determining, upon retrieving the corresponding packet from its corresponding per-connection queue, whether said per-connection queue is non-empty; and logic for generating, upon determination that said per-connection queue is non-empty, a request for scheduling a next packet from said per-connection queue.

21. An apparatus comprising a computer usable medium having computer readable program code means embodied therein for scheduling transmission times for a plurality of packets, the computer readable program code means comprising:

computer readable program code means for determining, upon receipt of each packet, a corresponding per-connection queue for said packet;

computer readable program code means for determining, upon determination of the corresponding per-connection queue, whether said per-connection queue is empty;

computer readable program code means for generating, upon determination that said per-connection queue is empty, a request for scheduling said packet;

computer readable program code means for calculating at least a desired execution time and a priority for said request;

computer readable program code means for storing said request until at least the desired execution time; and computer readable program code means for storing said request in one of a plurality of priority queues corresponding to the priority calculated for the request.

22. The apparatus of claim 21 further comprising:

computer readable program code means for selecting one request for each of a plurality of cell transmission times from among a number of requests stored in the plurality of priority queues.

23. The apparatus of claim 22 further comprising:

computer readable program code means for retrieving, upon selecting a request, a corresponding packet from its corresponding per-connection queue;

computer readable program code means for determining, upon retrieving the corresponding packet from its corresponding per-connection queue, whether said per-connection queue is non-empty; and computer readable program code means for generating, upon determination that said per-connection queue is non-empty, a request for scheduling a next packet from said per-connection queue.

* * * * *